Oct. 26, 1965　　　　　D. DAMAST　　　　　3,213,501
SECURING WASHERS
Filed April 2, 1963　　　　　　　　　　　2 Sheets-Sheet 1
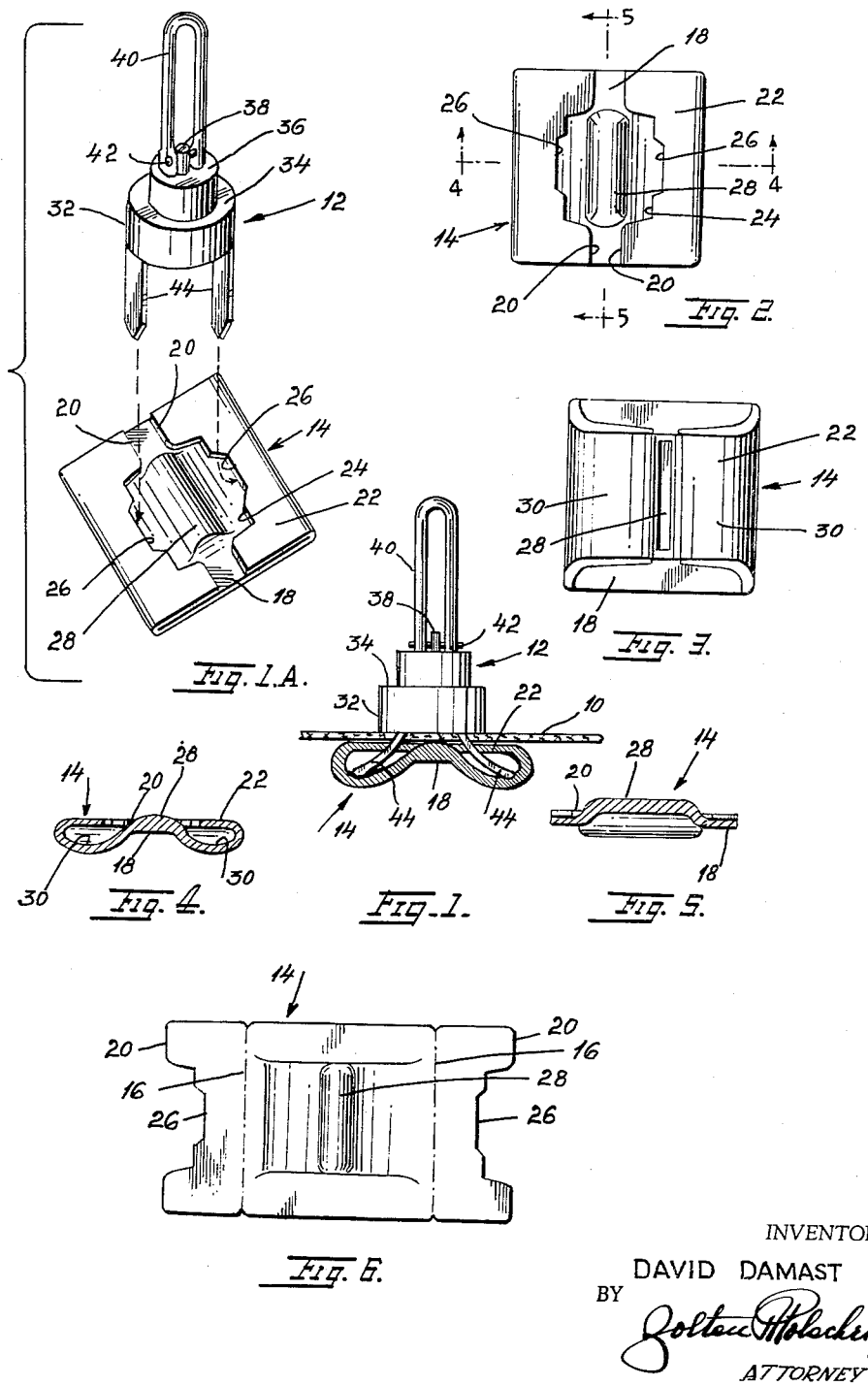
INVENTOR.
DAVID DAMAST
BY
ATTORNEY

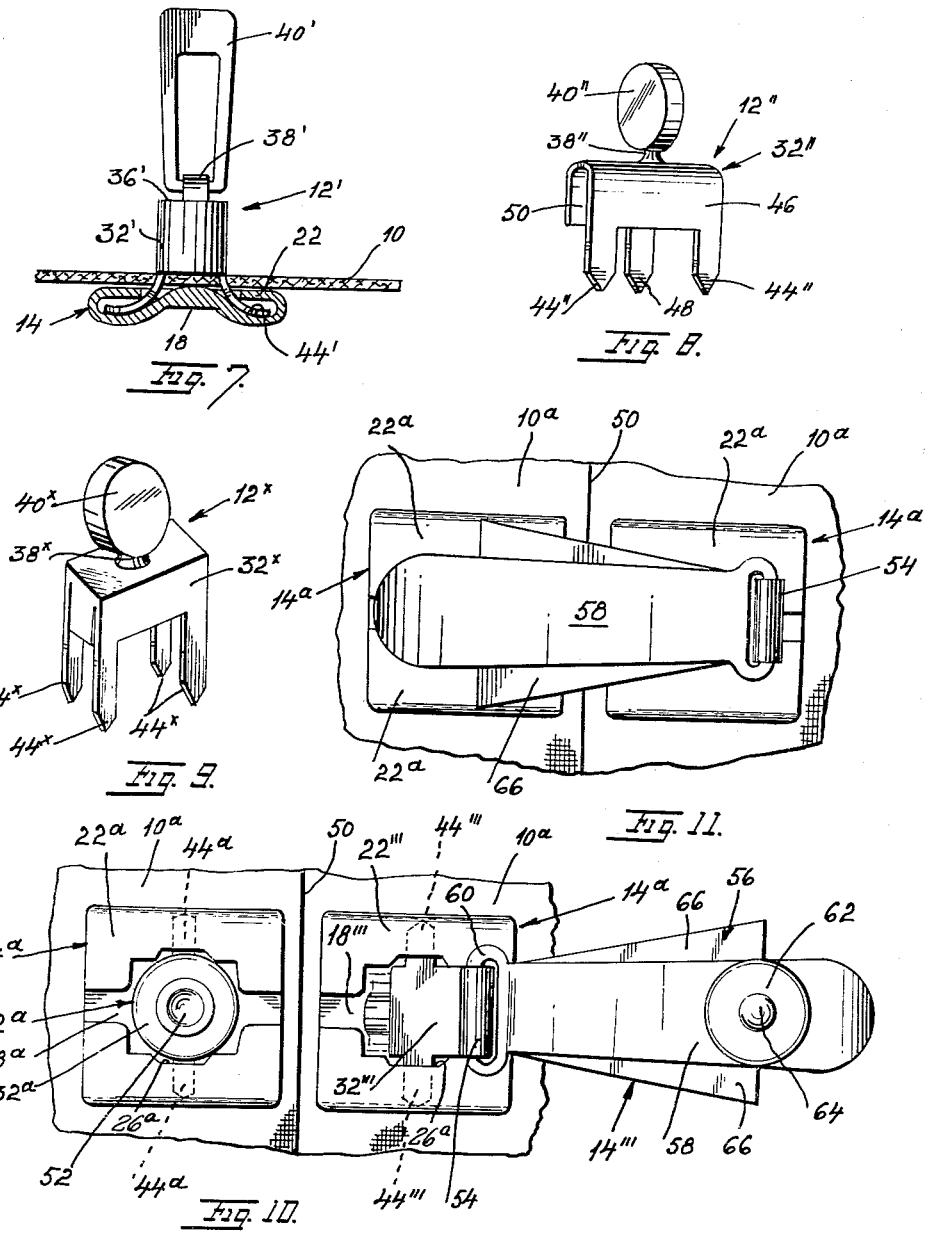

United States Patent Office 3,213,501
Patented Oct. 26, 1965

3,213,501
SECURING WASHERS
David Damast, 22—14 40th Ave., Long Island City, N.Y.
Filed Apr. 2, 1963, Ser. No. 269,986
1 Claim. (Cl. 24—95)

This invention relates generally to fasteners of the permanently locking type, and more particularly to a backwasher having a back plate serving as a die for the prongs of a fastener member.

In the making of handbags or the like, it is customary to pass prongs of some body member through the outer layer of handbag material to the interior of the bag, where the prongs are bent back against the inner surface of the material to anchor them. Heretofore washers have been used to anchor the prongs and at the same time the prongs serve to hold the washer, but the prongs are exposed to view. In some instances, an inner lining has been used to hide the prongs from view. However, inner linings are costly and are otherwise undesirable.

It is the principal object of the present invention to provide a backwasher that completely encloses the prongs of an attached fastener member.

Another object of the invention is to provide a backwasher and fastener member assembly in which the fastener member is prevented from turning relative to the backwasher.

A further object is to provide in the back plate of a backwasher a pair of die recesses having curved surfaces parallel to the prongs of a fastener member so that the prongs fully abut on the surfaces of the die recesses whereby relative turning between the fastener member and the backwasher is prevented in assembled condition.

Yet another object is to provide a backwasher of this type that is simple and rugged in construction and economical to manufacture.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a side elevational view of a fastener member and backwasher assembly, attached to a sheet of material, the backwasher being shown in section.

FIG. 1A is a spread perspective view of the fastener member and backwasher assembly.

FIG. 2 is a top plan view of the backwasher of FIG. 1.

FIG. 3 is a bottom plan view thereof.

FIG. 4 is a cross-sectional view taken on the line 4—4 of FIG. 2.

FIG. 5 is a vertical sectional view taken on the line 5—5 of FIG. 2.

FIG. 6 is a top plan view of the preshaped blank from which the backwasher is formed.

FIG. 7 is a view similar to FIG. 1 showing a modified form of fastener member, used with the backwasher of FIG. 1.

FIG. 8 is a front perspective view of another modified form of fastener member capable of use with the backwasher of FIG. 1.

FIG. 9 is a front perspective view of yet another modified form of fastener member.

FIG. 10 is a top plan view of still another modification of the invention, the latching member shown in inoperative position.

FIG. 11 is a view similar to FIG. 10, but showing the latching member in operative position.

Referring in greater detail to the drawings, in FIG. 1 a fastener member and backwasher assembly is shown attached to a sheet of material 10, such as the material of a lady's handbag. The assembly comprises a fastener member 12 and a backwasher 14.

The backwasher 14 comprises a rectangular metal plate bent upon itself along two parallel fold lines 16 so that the central portion of the metal plate forms a square back plate 18. The end portions of the rectangular metal plate have their end edges 20 closely spaced from each other as shown in FIG. 2, forming a front plate 22. The end edges 20 are shaped centrally of the plate providing a central recess 24 in the front plate and the recess is formed with central opposed notches 26. The back plate 18 is bent reversely to form a central bulge 28 and recesses 30, 30 on both sides thereof, parallel to the bulge. The recesses 30 have curved cross sections in a plane perpendicular to the fold lines 16 as seen in FIG. 4. The surfaces of the recesses 30 are parallel to the fold lines 16 and perpendicular to the plane of the section of FIG. 4.

The fastener member 12 may be formed of sheet metal and consists of a hollow cylindrical stepped body 32 forming an annular shoulder 34 and a top wall 36 and being open at the bottom. A post 38 is suitably fastened to the top wall and extends upwardly therefrom for pivotally supporting an inverted U-shaped handle 40 by means of a pivot pin 42. A pair of integral straight opposed pointed prongs 44 depend from the periphery of the body.

In assembling the fastener member 12 and backwasher 14, the backwasher 14 is placed in a suitable recess of a press table, and the still straight prongs 44 of the fastener member 12 are pressed by the press through the sheet 10 and notched portions 26 of the recess 24 against the surfaces of the recesses 30, which serve as dies and curve the prongs 44 until they assume the position shown in FIG. 1. The prongs fully abut on the surfaces of the recesses 30 since the surfaces of the recesses and the prongs are parallel to each other. Consequently, turning of the fastener member 12 relative to the backwasher 14 is not possible.

As seen in FIG. 1, the prongs are completely enclosed in the space between the front plate and the back plate of the backwasher, and pierce the material 10 only under the main body of the fastener member 12. Accordingly, the sharp points of the prongs can never be touched by the person using the device.

A modified form of fastener member 12' is shown in FIG. 7 wherein the body 32' of the member comprises a single hollow cylindrical member formed with a top wall 36'. A metal loop 38' projects upwardly from the top wall at its center for pivotally supporting an elongated slotted plate 40' forming a handle. The prongs 44' are similar to prongs 44.

Another modified form of fastener member 12'' is shown in FIG. 8 and includes a channel-shaped metal body 32'' having a pair of integral prongs 44'' depending from the ends of one long side 46 and having a single prong 48 depending from the other long side 50 at its center, and disposed between the prongs 44''. A round disc-shaped plate 40'', formed integrally with a post 38'' extending upwardly from the top of the body 32'' at its center, serves as a handle. The prongs 44'' pass through the recess 24 and the prong 48 passes through one of the notches 26, and such prongs bend into interlocking relation with the back plate 18 and the front plate 22.

In the modified form of fastener member $12^x$ shown in FIG. 9, the body $32^x$ is rectangular in shape and hollow with a prong $44^x$ formed integrally with the body and depending from each corner of the body. A round disc-like plate $40^x$, on a post $38^x$, at the center of the body, serves as a handle.

Referring now to the modification of the invention shown in FIGS. 10 and 11, in this form a pair of backwashers $14^a$ is shown fastened on the sheet material $10^a$ of a handbag on both sides of an opening in the handbag indicated by the line 50. A fastener member 12$^a$ having a round circular body 32$^a$ with a central socket opening 52 and with depending prongs 44$^a$ is fastened to the sheet material 10$^a$ by passing the prongs 44$^a$ through the material and bending same in interlocking relation with the front and rear plates 22$^a$ and 18$^a$, respectively, of the backwasher 14$^a$ on the material at the left-hand side of the line 50.

A fastener member 14''' in the form of a rectangular plate 32''' has a loop 54 formed at one end and with prongs 44''' formed at the other end on opposite sides thereof, the prongs extending perpendicularly to the plane of the plate 32'''. A latching unit 56 is pivotally connected to the loop 54 and includes an elongated rectangular metal plate 58 formed with an integral loop 60 at one end pivotally connected to loop 54. A button 62 is carried at the other end of plate 58 and is provided with a stud 64 adapted to be snapped into the socket opening 52 in body 32$^a$. The plate 58 is formed with side wings 66 for decorative purposes.

In application, a backwasher 14$^a$ is placed under a sheet of material 10$^a$. A fastener and receiver member 12$^a$ is attached to the backwasher 14$^a$ by inserting the prongs 44$^a$ through the material and through the notches 26$^a$ in the backwasher against the material of the back plate 18$^a$ whereupon the prongs 44$^a$ bend laterally and become interlocked between the front and rear plates 22$^a$ and 18$^a$, respectively, as seen in FIG. 10.

Another backwasher 14$^a$ is placed under the adjacent sheet of material 10$^a$. A fastener member 14''' is attached to the latter backwasher by inserting the prongs 44''' through the material of the sheet and against the material of the back plate 18''' whereupon the prongs bend laterally as viewed in FIG. 10 into interlocking relation with the front plate 22''', and the rear plate 18'''. When the backwashers are thus positioned and secured, the pivotal handle 56 is in line with the fastener member 32$^a$ so that upon swinging the handle 56 over the fastener member 32$^a$, the stud 64 carried thereby will snap into the socket opening 52 in the fastener member 32$^a$ thereby fastening the sheets of material to each other.

While I have illustrated and described the preferred embodiments of my invention, it is to be understood that I do not limit myself to the precise constructions herein disclosed and that various changes and modifications may be made within the scope of the invention as defined in the appended claim.

Having thus described my invention, what I claim as new, and desire to secure by United States Letters Patent is:

A backwasher comprising a rectangular metal plate having a central portion and two end portions bent upon said central portion along two parallel fold lines, said end portions having free end edges closely spaced from each other, so that said central portion forms a square back plate and said end portions form a square front plate superimposed on said back plate and integrally connected to the same along said fold lines, said front plate having a central recess therein and having notches centrally of the recess located in a plane perpendicular to said fold lines, said back plate being formed with two elongated recesser with a central bulge therebetween, each recess being located opposite one notch and adjacent the central bulge, each recess having curved cross sections in planes perpendicular to said fold lines, and having surfaces parallel to said fold lines.

References Cited by the Examiner

UNITED STATES PATENTS

| 807,020 | 12/05 | Duke | 24—208 |
| 2,011,472 | 8/35 | Chobert | 24—221 |
| 2,241,437 | 5/41 | Worthington | 292—209 |
| 2,626,443 | 1/53 | Blazej | 24—218 |
| 2,928,153 | 3/60 | Reiter | 24—95 X |
| 2,975,495 | 3/61 | Wolf et al. | 24—95 |

FOREIGN PATENTS

| 653,592 | 11/28 | France. |
| 26,784 | 1910 | Great Britain. |
| 403,971 | 1/34 | Great Britain. |

WILLIAM FELDMAN, *Primary Examiner.*

M. HENSON WOOD, Jr., DONLEY J. STOCKING,
*Examiners.*